United States Patent
Richard et al.

(10) Patent No.: US 9,473,755 B2
(45) Date of Patent: Oct. 18, 2016

(54) ADAPTIVE COLOUR FILTER FOR DIGITAL SENSOR

(71) Applicant: Swiss Timing Ltd, Corgemont (CH)

(72) Inventors: Pascal Richard, Corgemont (CH); Fabien Blondeau, Chezard St-Martin (CH)

(73) Assignee: Swiss Timing Ltd., Corgemont (CH)

( * ) Notice: Subject to any disclaimer, the term of this patent is extended or adjusted under 35 U.S.C. 154(b) by 0 days.

(21) Appl. No.: 14/576,759

(22) Filed: Dec. 19, 2014

(65) Prior Publication Data
US 2015/0181189 A1    Jun. 25, 2015

(30) Foreign Application Priority Data

Dec. 20, 2013  (EP) ..................................... 13199039

(51) Int. Cl.
| H04N 9/04 | (2006.01) |
| H04N 9/73 | (2006.01) |
| G02B 5/20 | (2006.01) |
| G03B 11/00 | (2006.01) |

(52) U.S. Cl.
CPC .............. *H04N 9/735* (2013.01); *G02B 5/201* (2013.01); *G03B 11/00* (2013.01); *H04N 9/045* (2013.01)

(58) Field of Classification Search
CPC ........ H04N 9/045; H04N 9/07; H04N 9/077; H04N 9/083; G02B 5/201; G03B 11/00
See application file for complete search history.

(56) References Cited

U.S. PATENT DOCUMENTS

| 5,278,657 | A | 1/1994 | Tamura |
| 6,411,329 | B1 | 6/2002 | Richard et al. |
| 7,417,210 | B2 * | 8/2008 | Ax, Jr. ................. G01C 11/025 250/201.1 |
| 2006/0203113 | A1 * | 9/2006 | Wada ..................... H04N 9/045 348/302 |
| 2010/0253833 | A1 | 10/2010 | Deever et al. |
| 2012/0098975 | A1 | 4/2012 | Chao et al. |
| 2012/0293669 | A1 * | 11/2012 | Mann ................... G01C 11/025 348/207.11 |
| 2012/0300105 | A1 | 11/2012 | Deever et al. |
| 2013/0113958 | A1 | 5/2013 | Chen et al. |

(Continued)

FOREIGN PATENT DOCUMENTS

| CN | WO 2013029516 A1 * | 3/2013 | ....... H01L 27/14621 |
| EP | 0 516 449 A1 | 12/1992 | |
| EP | 0 898 249 A1 | 2/1999 | |

OTHER PUBLICATIONS

European Search Report issued Apr. 11, 2014 in European Application 13199039, filed on Dec. 20, 2013 (with English Translation).

(Continued)

*Primary Examiner* — Timothy J Henn
(74) *Attorney, Agent, or Firm* — Oblon, McClelland, Maier & Neustadt, L.L.P

(57) ABSTRACT

Color filter for a digital sensor formed of a two-dimensional array of pixels, each pixel corresponding to a given color. The pixels are arranged in at least one base pattern repeated over a given surface, which has at least three pixels of three different colors. The color filter is characterized in that it includes a plurality of distinct base patterns, each of these patterns having predefined optical properties of sensitivity, of color quality and of resolution, and in that it is subdivided into a plurality of distinct areas, each corresponding to a two-dimensional sub-array of pixels. Each of the base patterns is repeated several times along each dimension of the two-dimensional sub-array, respectively over the entirety of a corresponding area.

9 Claims, 2 Drawing Sheets

(56) References Cited

U.S. PATENT DOCUMENTS

2013/0286262 A1    10/2013  Hayashi et al.
2014/0168446 A1*   6/2014   Peng ................ H01L 27/14621
                                                          348/164

OTHER PUBLICATIONS

"Manual MacFinish 2D 100", XP055113153, http://www.timetronics.be/Manuals/2012v1 2012, 84 pages.

* cited by examiner

ADAPTIVE COLOUR FILTER FOR DIGITAL SENSOR

This application claims priority from European Patent Application No. 13199039.2 filed Dec. 20, 2013, the entire disclosure of which is incorporated herein by reference.

FIELD OF THE INVENTION

The present invention concerns an adaptive colour filter for a digital array sensor, particularly suitable for a photo finish camera, and a particular method of adjustment associated with such a camera.

STATE OF THE ART

Photosensitive sensors, formed of a mosaic of pixels, have long been known in the field of digital photography; the sensors most widely used for digital cameras use, for example, CCD (charge-coupled device) or CMOS (complementary metal oxide semiconductor) technology. In order to produce colour images, colour filters are applied to these digital sensors; the filters also take the form of an array of different colours, each colour being dedicated to a pixel of the sensor on which it is superposed. The colour that must be associated with each pixel of the resulting image is then obtained through image processing algorithms.

One of the most widely known colour filters is the Bayer filter, which is the most conventional form of RGB filter (R for Red, G for Green, and B for Blue, these three colours being the base colours from which any other colour can be obtained through a combination of additive synthesis). Such a filter uses a base pattern covering 4 pixels, and which is repeated over the entire surface of the sensor, with two green pixels in opposite corners completed by a blue pixel and a red pixel.

A drawback of this type of colour filter is the considerable reduction in sensitivity of the associated digital sensor due to the significant attenuation of light which reaches the sensor. Indeed, a good part of the wave lengths are absorbed by the different filters. For these reasons, different variants of the Bayer filter have since been proposed, replacing, in particular, one of the two green pixels with a white pixel in order to improve the sensitivity of the sensor. The modified base pattern is in this case also repeated over the whole filter.

In the field of sports competitions, auxiliary timing devices based on image recognition, more commonly referred to as "photo finish" devices are also known. Such systems allow an operator to distinguish between competitors crossing the finish line by viewing successive images taken by a high definition camera centred precisely on the finish line. By analysing the sequence of images, taken at successive given moments and consequently corresponding to different measured times, it is possible to determine after the event, but still very rapidly after the finish, the exact times at which each competitor crossed the line, for example to a thousandth of a second and thereby rank the competitors in a reliable manner.

The cameras used by these photo finish devices often include Linescan type CCD sensors (more commonly known by the acronym LS-CCD) whose image capture rate is even higher than that of standard CCD cameras, thereby allowing for a temporal resolution of up to a ten-thousandth of a second. The first sensors used for such cameras had a very specific array structure in the form of a bar, that is to say a single column of pixels aligned very precisely on the finish line. Nowadays, standard two-dimensional array sensors are more likely to be used, with the selection of the column aligned on the finish line being performed by software.

For such photo finish cameras equipped with LS-CCD sensors, RGB filters as described above may of course be used to obtain colour images. Nevertheless, these filters are not suited to provide sufficient quality in all race conditions. Indeed, depending for example on the time of the competition or the weather conditions, the ambient luminosity may vary significantly and thereby strongly impair the quality of the images obtained. The same applies for considerations regarding the type of race, which influence the speed of the competitors according to the events and therefore the parameters of the shot, including the exposure time.

There exists therefore a need for a colour filters for digital sensors without these known limitations.

BRIEF SUMMARY OF THE INVENTION

It is an object of the present invention to provide a colour filter for a digital sensor having improved optical properties.

It is another object of the present invention to provide an efficient method for the adjustment of a photo finish camera using such a sensor.

These objects, in addition to others, are achieved as a result of a colour filter for a digital sensor formed of a two-dimensional array of pixels, each pixel correspond to a given colour. The pixels are arranged in at least one base pattern repeated over a given surface, which has at least three pixels of three different colours. The colour filter is characterized in that it includes a plurality of distinct base patterns, each of these patterns having predefined optical properties of sensitivity, of colour quality and of resolution, and in that it is subdivided into a plurality of distinct areas, each corresponding to a two-dimensional sub-array of pixels, each of the base patterns being repeated respectively over the entirety of a corresponding area.

These objects are also achieved as a result of a method of adjusting a photo finish camera using such a colour filter, characterized in that it includes the following steps:
- a first step of selecting a base pattern having optical properties of sensitivity, of colour quality and of resolution, which are predefined according to race parameters;
- a second step of moving said photo finish camera so that the finish line of the timed race is positioned facing an area corresponding to said selected base pattern;
- a third step of adjustment by software of a set of adjacent columns, whose number corresponds to the width of said selected base pattern, on the finish line;

Specific embodiments of the invention are defined in the dependent claims.

An advantage of this invention is that it makes it possible to permanently optimise the optical properties of the colour photos obtained using such a filter, regardless of the conditions of use.

Another advantage of the solution proposed is that it allows for easy-to-implement adjustment of the optical parameters selected for a shot.

BRIEF DESCRIPTION OF THE DRAWINGS

Advantageous example implementations of the invention are given in the description and illustrated in the annexed Figures, in which.

EXAMPLE EMBODIMENT(S) OF THE INVENTION

Figure 1:
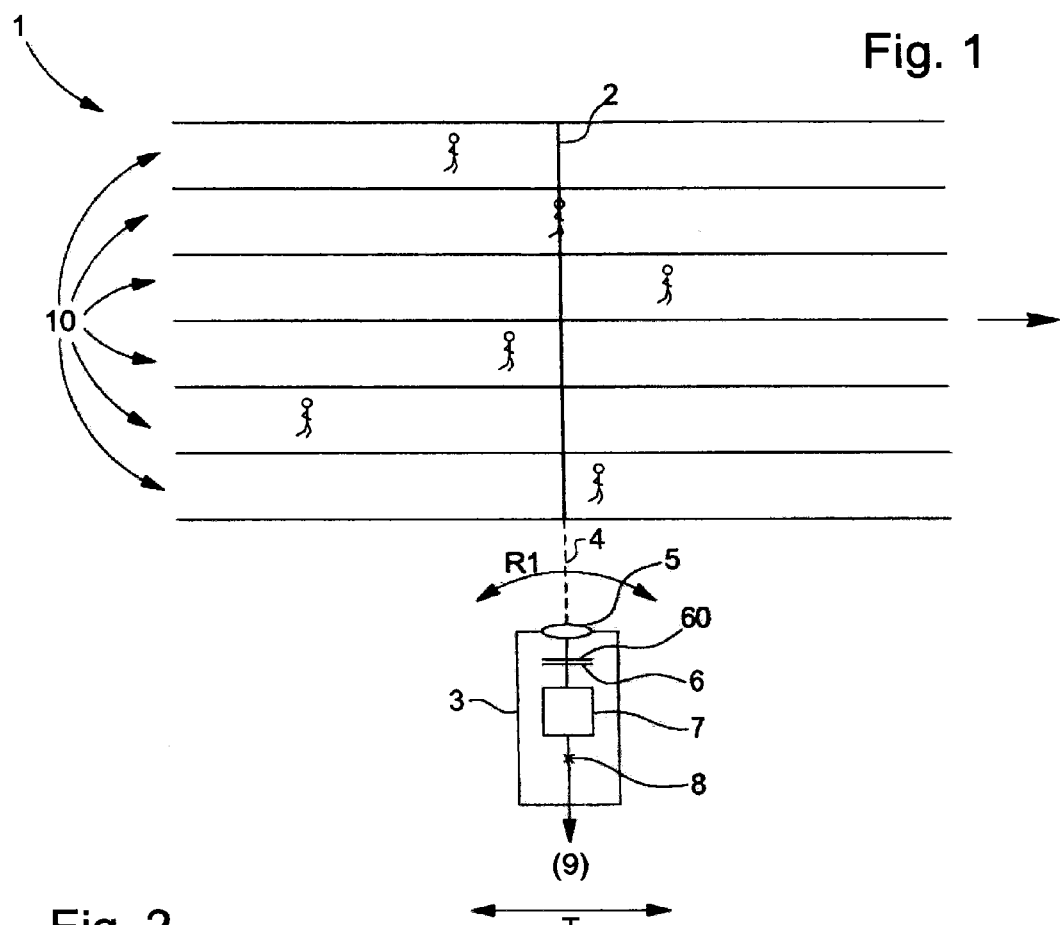
FIG. 1 respectively shows a top view of a photo finish camera used within the scope of the invention, aligned on a finish line.

FIG. 1 shows a block diagram of a photo finish camera used according to this invention. The preferably LS-CDD photo finish camera 3, is aligned on the finish line 2 of a track 1 preferably including several lanes 10 in which different competitors move. It is to be noted that the example of an athletics track 1 is purely indicative and non-limiting, photo finish cameras 3 may also be used in cycling races, car track races, or also for horse races.

Photo finish camera 3 preferably has four degrees of freedom: three in rotation and one in translation. In FIG. 1 only the transverse degree of freedom T and the first rotational degree of freedom R1 about a vertical axis are shown. Nevertheless the camera is preferably rotatably mounted about a ball and socket joint 8 which simultaneously has second and third additional rotational degrees of freedom R2, R3 in order to manage the alignment of the optical axis 4 of camera 3 on finish line 2. Photo finish camera 3 includes a digital sensor 6 formed of a pixel array, as well as an image processing device 7 providing a digital output signal 9 corresponding to the image detected by the sensor. In order to form colour images, photo finish camera 3 also includes a specific colour filter 60 whose optical properties may be adjusted according to various predefined parameters, discussed hereafter. According to a preferred embodiment, this colour filter 60 is affixed directly to the pixels of digital sensor 6, so that the term "pixels" is inaccurately also used for the filter to refer to the different colours respectively covering each pixel of digital sensor 6.

Figure 2:
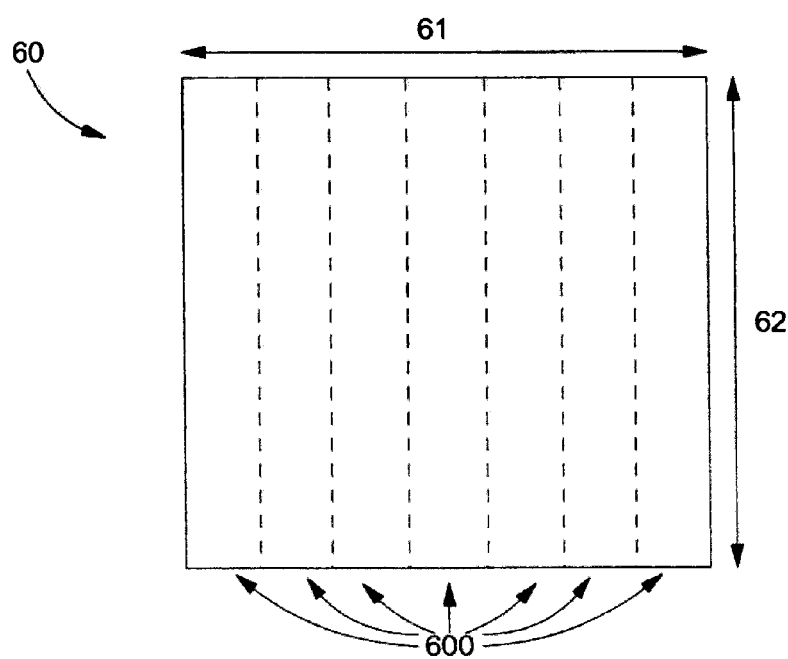
FIG. 2 illustrates a diagram of a filter according to a preferred embodiment of the invention.

A colour filter 60 according to a preferred embodiment of the invention is schematically illustrated in FIG. 2, which shows a plurality of areas 600 covering all of the columns and lines of pixels, respectively referenced 61 and 62, and which correspond to the width and total height of colour filter 60. As will be seen in light of the description of FIG. 3 below, each of these different areas 600 is intended to have a base pattern having distinct specific optical properties, thus making it possible to adapt the shooting parameters according to the area 600, and thus to the corresponding base pattern, which is chosen. According to the preferred embodiment illustrated, each of the areas extend over all of the lines of pixels 62, i.e. over the entire height of the sensor, namely typically 2048 pixels. This type of configuration of a colour filter 60 is particularly advantageous for a photo finish camera which uses at most a few columns of pixels aligned on the finish line, but columns of maximum height, since the height defines the height of the image that is taken. It is, however, possible to envisage, within the scope of the present invention, a subdivision into areas 600 formed of two-dimensional arrays whose height can be chosen with the aid of software and which might, therefore, not extend over the entire height of the filter, i.e. all of the lines of pixels 62.

According to this preferred embodiment, the colour filter 60 further preferably includes between 1024 and 2048 columns of pixels.

Figure 3:
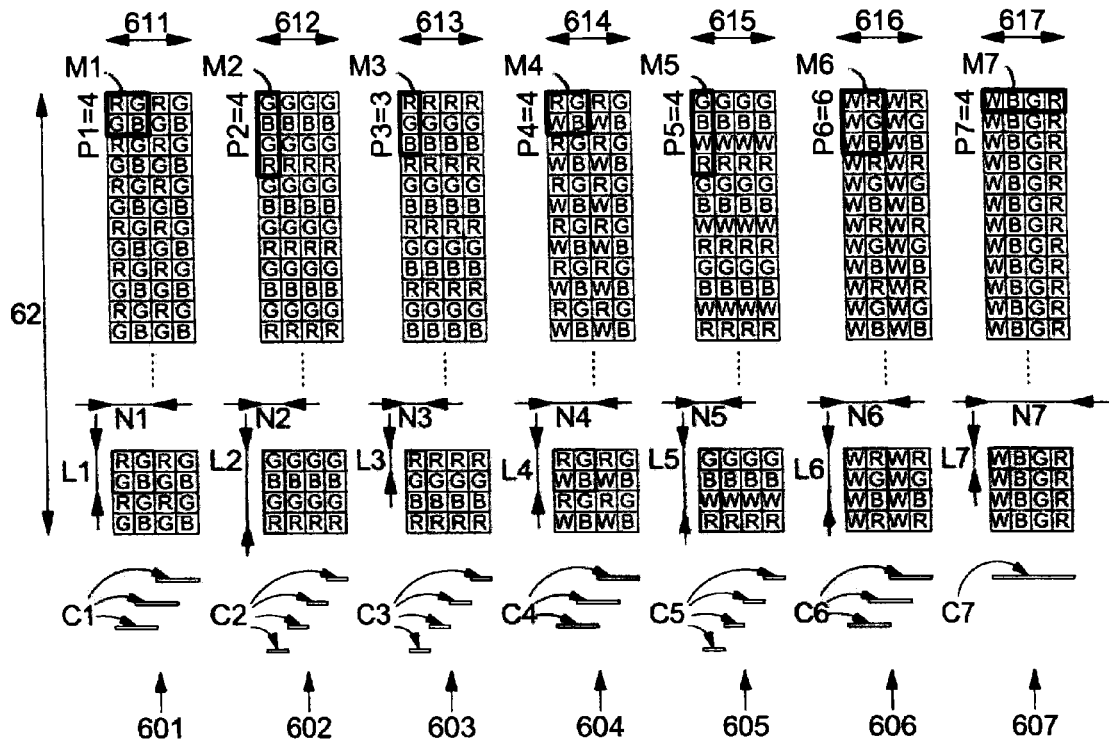
FIG. 3 illustrates a filter and the various base patterns thereof repeated over different areas according to a preferred embodiment of the invention.

FIG. 3 shows a filter according to a preferred embodiment of the invention including a plurality of different areas, here 7 in number, with which specific respective base patterns are associated. Thus, a first pattern M1, which corresponds to the conventional first pattern RGB with 2 green pixels G supplemented by a red pixel R and a blue pixel B, is repeated over the entire first area 601, a second pattern M2 is repeated over the entire second area 602 etc. up to the seventh pattern on seventh area 607.

As can be observed in FIG. 3, each of areas 601 to 607 extends over all of the lines of pixels 62, i.e. over the height of the entire filter. The width of each of these areas is preferably comprised between 100 and 200 pixels, and the total width of colour filter 60, corresponding to the entire number of columns 61, is preferably comprised between 1024 and 2048 pixels. These area widths are respectively referenced 611 for the width of first area 601, 612 for that of second area 602, 613 for that of third area 603, 614 for that of fourth area 604, 615 for that of fifth area 605, 616 for that of sixth area 606, and finally 617 for that of seventh area 607. According to the preferred embodiment illustrated in FIGS. 2 and 3, each of areas 600 has the same width, so that widths 611 to 617 are identical. However, according to another preferred embodiment, it could be envisaged to adjust the width of each of the different areas of the filter according to their probable use, which is determined empirically or statistically. Thus, a larger width could be given to an area on which the repeated base pattern has optimised optical properties for normal conditions of use. For a photo finish camera 3 using such a colour filter 60 for athletics competitions determining a speed of around 1000 lines per second, it is possible, for example, to define a pattern associated with mean daytime and night-time light, and to increase the widths of the areas on which these patterns are repeated, in order to minimise the physical movements of the camera once finish line 2 is aligned on one of these areas.

If a detailed analysis is made of each of the patterns used by filter 60 of FIG. 3, it is noted that each of the base patterns systematically contains at least one red R, green G, and blue B pixel, and that:

the first base pattern M1 is formed of four pixels, two of which are green, arranged in an array of 2*2 pixels (first height L1 of two pixels and first width N1 also of two pixels);

the second base pattern M2 is also formed of four pixels, of which two are again green, but arranged in an array of 1*4 pixels (second height L2 of four pixels, but second width N2 of one pixel);

the third base pattern M3 is formed of only three pixels, arranged in an array of 1*3 pixels (third height L3 of three pixels, and third width N3 of one pixel);

the fourth base pattern M4 is also formed of four pixels, arranged in an array of 2*2 pixels, like first pattern M1, but wherein one green pixel has been replaced by a white pixel W (fourth height L4 of two pixels and fourth width N4 also of two pixels);

the fifth base pattern M5 is also formed of four pixels, but arranged in an array of 1*4 pixels, like the second pattern M2 but wherein one green pixel has been replaced by a white pixel W (fifth height L5 of four pixels, and fifth width N5 of one pixel);

the sixth base pattern M6 is also formed of six pixels, arranged in an array of 2*3 pixels (sixth height L6 of three pixels, and sixth width N6 of two pixels); this is in fact the third base pattern M3 to which a column of white pixels W has been added;

finally, the seventh base pattern M7 is formed of four pixels, arranged in a line, i.e. in an array of 4*1 pixels (seventh height L7 of one pixel, but seventh width N7 of four pixels).

The optical properties obtained by means of each base pattern are determined, amongst other factors, by the three following parameters:

Sensitivity S, which is modelled, within the scope of this invention, as corresponding to the average quantity of light per pixel, with a quantity of 20% available per blue pixel B, 30% per red pixel R, 50% per green pixel G and 100% per white pixel W. This parameter is therefore strongly influenced, on the one hand, by the number of white pixels W, and on the other hand, by the respective number of pixels P1, P2, P3, P4, P5, P6 and P7 of each pattern M1-M7, by which the overall sensitivity of all the pixels of the filter is divided. The extreme sensitivities are consequently those of the third base pattern 3 (the least good) and that of pattern 6 (the best);

Colour quality Q, which is modelled, within the scope of the invention, as being inversely proportional to the number of lines in the pattern required to obtain the calculation of the colour of each pixel by image processing algorithms. For the various base patterns used, it is seen that the best colour quality Q is obtained with the aid of the seventh base pattern M7, whereas the least good is obtained with the aid of the second and fourth patterns M2 and M4;

and resolution N, which is modelled as being equal to the number of columns N1-N7 of each base pattern. Thus, the resolution at finish line 2 will improve as the number of respective columns N1-N7 of each base pattern M1-M7 decreases. Thus, the best resolution will be provided by the second, third and fifth base patterns M2, M3, M5.

To evaluate the overall optical performance of each pattern, the scores obtained for each of the parameters S, Q and N above could preferably be multiplied; however, the choice of pattern could be made taking account of any weighting, particularly for sensitivity parameter S.

It may be noted that of the seven patterns illustrated, at least two base patterns include a different number of white pixels W, such as, for example, the fourth pattern M4 and the sixth pattern M6, which makes it possible to adjust sensitivity on at least three distinct levels (high-medium-low) by counting the base patterns which do not include any white pixels W and which are consequently unsuitable for low levels of light. Further, the fact that the number of pixels P1-P7 of base patterns M1-M7 is comprised, according to the preferred embodiment illustrated in FIG. 3, between 3 and 6, i.e. a very low number, facilitates the image processing process whose complexity is comparable to that of a standard Bayer RGB filter with four pixels. Finally, the fact that each of base patterns M1-M7 extends over a maximum of four columns or four lines makes it possible to choose a good compromise between the colour quality Q and the resolution N of the image obtained, while leaving a large choice of the numbers of base patterns, preferably higher than six, to allow adaptation to the largest possible number of types of race and weather conditions, with at least three base scenarios or each type of race in terms of light, typically favourable for clear weather, medium for cloudy weather and unfavourable for night-time.

One particularly advantageous characteristic of the various base patterns M1-M7 selected according to the preferred embodiment of the invention and which are illustrated in FIG. 3, is that they permit a random selection of sets of adjacent columns for identical optical properties of sensitivity S, colour quality Q and resolution N, and therefore do not require software adjustment over a set of specific columns of an area. It is possible, in fact, to verify that for any of patterns M1-M7, only the respective widths N1-N7 in numbers of pixels determine the properties of sensitivity S of the set of selected columns, the other parameters being already fixed at that moment:

the first set of columns C1 corresponding to the first pattern M1, the fourth set of columns C4 corresponding to the fourth base pattern M4, and the sixth set of columns C6 corresponding to the sixth base pattern M6, are each formed of two adjacent columns, which can be chosen in a totally random manner respectively over first area 601, fourth area 604, and sixth area 606. In FIG. 3, only three different possibilities are illustrated for a width of four columns:

the second set of columns C2 corresponding to the second base pattern M2, the third set of columns C3 corresponding to the third base pattern M3, and the fifth set of columns C5 corresponding to the fifth base pattern M5, are formed of only one column, which can be chosen from anywhere on their respective area, i.e. on second area 602, third area 603, and fifth area 605 (four equivalent possibilities are illustrated for a width of four columns);

the seventh set of columns C7 corresponding to the seventh base pattern M7 are formed of four columns, which may be chosen from anywhere on seventh area 607.

This property is particularly advantageous for the use of a colour filter 60 integrated in a photo finish camera 3, for which a fine adjustment step could be omitted following determination of the pattern to be used and thus the corresponding area.

Figure 4:
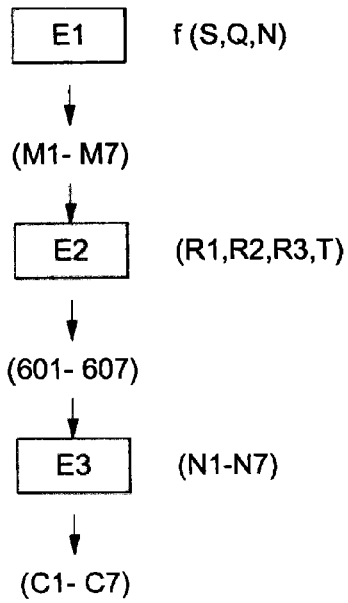
FIG. 4 illustrates a diagram of the various steps of the method for the adjustment of a photo finish camera used within the scope of the present invention.

FIG. 4 shows a sequence of steps of adjusting a photo finish camera 3 according to a preferred embodiment of the invention.

After a first step E1 of choosing a base pattern having optical properties of sensitivity S, colour quality Q and resolution N predefined according to race parameters, such as the weather conditions and the type of race (the speed of movement of the number of lines of pixels per second may vary between 1000 lines per second for athletics to more than 10,000 lines per second for motor racing, the speed for cycling races and horse races being around 3,000 lines per second), photo finish camera 3 is physically moved in a second step E2, so that finish line 2 of the timed race is positioned facing an area corresponding to said selected base pattern. Since there is more than one solution to this problem given the degrees of freedom involved, i.e. the degree of freedom in translation T and the three degrees of freedom in rotation R1, R2, R3, inverse kinematic algorithms could be used for this purpose, like those used in robotics for finding the solution requiring the fewest possible manipulations, with possible weighting of certain degrees of freedom which are required to be permanently set as far as possible.

Finally, it is possible to perform a third step E3 of adjustment by software of a set of adjacent columns, depending on the base pattern of the selected area, for example with the aid of a reticle, as in the solution proposed by EP Patent No 0898249. This will, however, simply mean choosing a number of columns corresponding to the width N of said base pattern selected from among patterns M1-M7, but not selecting any particular columns from among the columns of the corresponding area. To align the set of adjacent columns on finish line 2, in theory, the central column of the set should be aligned on finish line 2 for odd numbers of columns, and finish line 2 between two columns for an even number of columns. This latter step of alignment is, however, very simple in practice when a graticule is used, as mentioned above, and when the column traversed by the reticle is selected by default. This column traversed by the reticle then simply has to be randomly supplemented by adjacent columns until the desired number, corresponding to the width of the selected pattern, is obtained.

It will, however, be understood that the base patterns M1-M4 have been given merely by way of example to illustrate a particularly preferred embodiment. However, other base patterns, such as, for example, an RGB 2*2 pattern with inserted columns of white pixels W, could also be envisaged to correspond to extremely unfavourable lighting conditions. The base pattern would then be formed of two lines, like a conventional RGB pattern, but not with two columns, but four (one of two white pixels W, one of red-green R-G pixels, then another of two white pixels W, followed by one of two green-blue G-B pixels). Such a pattern has resolution problems, however, due to the high number of columns of pixels which have to be employed. Similarly, yet another pattern of 16 pixels (4*4) of an RGB filter could be formed whose dimensions are doubled, i.e. an array of 2*2 red pixels R, blue pixels B, and two such arrays of 2*2 green pixels in the opposite corners of the 4*4 array. Such a pattern would have advantages in terms of "binning", i.e. decreased noise effect due to the grouping of adjacent pixels of the same colour prior to amplification and digitisation, but would result, at the same time, in decreased resolution, and would not allow random selection of a number of adjacent columns, as in the third step E3 above.

Further, another triad of colours could also be envisaged for synthesising the colour of each pixel, such as, for example, cyan, magenta and yellow instead of red, green and blue.

What is claimed is:

1. A colour filter for a digital sensor, said colour filter comprising:
    a two-dimensional array of pixels, each pixel corresponding to a given colour, said pixels being arranged in at least one base pattern repeated over a given surface, said base pattern having at least three pixels of three different colours;
    a plurality of distinct base patterns, each of said patterns having predefined optical properties of sensitivity, of colour quality, inversely proportional to a number of lines of said each pattern, and of resolution, equal to a number of columns of said each pattern,
    wherein the filter is subdivided into a plurality of distinct areas, each of said areas corresponding to a two-dimensional sub-array of pixels, each of said base patterns being repeated a plurality of times along each dimension of said two-dimensional sub-array, respectively, over the entirety of a said each area, and
    wherein each of the plurality of distinct base patterns includes a different number of white pixels.

2. The colour filter according to claim 1, wherein said each of said areas extends over all of lines of pixels of said filter.

3. The colour filter according to claim 2, wherein said each of said areas has a variable width.

4. The colour filter according to claim 2, wherein all of the base patterns include at least one blue pixel, one green pixel, and one red pixel, and wherein at least some base patterns further include at least one white pixel.

5. The colour filter according to claim 1, wherein the number of pixels of said base patterns is comprised between 3 and 6.

6. The colour filter according to claim 5, wherein each base pattern extends over a maximum of four lines of pixels and four columns of pixels.

7. A photo finish camera including a colour filter according to claim 1 and a digital array sensor, said photo finish camera being mounted to rotate about a ball and socket joint possessing three degrees of freedom in rotation and also possessing one degree of freedom in translation in the direction of the race.

8. A method of adjusting a photo finish camera according to claim 7, wherein the method includes the following steps:
    a first step of selecting a base pattern, of the plurality of distinct base patterns, having optical properties of sensitivity, of colour quality and of resolution which are predefined according to race parameters;
    a second step of moving said photo finish camera so that the finish line of the timed race is positioned facing an area corresponding to said selected base pattern;
    a third step of adjustment by software of a set of adjacent columns, whose number corresponds to the width of said selected base pattern, on said finish line.

9. The method of adjusting a photo finish camera according to claim 8, wherein the choice of said set of adjacent columns depends solely on the number of pixels determining the width of said selected base pattern.

* * * * *